(12) United States Patent
Kato

(10) Patent No.: US 7,513,140 B2
(45) Date of Patent: Apr. 7, 2009

(54) SENSING CIRCUIT FOR VIBRATION TYPE OF ANGULAR RATE SENSOR

(75) Inventor: Kenji Kato, Okazaki (JP)

(73) Assignee: DENSO CORPORATION, Kariya (JP)

( * ) Notice: Subject to any disclaimer, the term of this patent is extended or adjusted under 35 U.S.C. 154(b) by 357 days.

(21) Appl. No.: 11/249,133

(22) Filed: Oct. 13, 2005

(65) Prior Publication Data

US 2006/0082255 A1 Apr. 20, 2006

(30) Foreign Application Priority Data

Oct. 15, 2004 (JP) ............................. 2004-301351

(51) Int. Cl.
*G01P 21/00* (2006.01)
*G01P 3/44* (2006.01)
(52) U.S. Cl. ..................... 73/1.37; 73/504.12
(58) Field of Classification Search .............. 73/504.16, 73/504.2, 504.12, 651, 1.37
See application file for complete search history.

(56) References Cited

U.S. PATENT DOCUMENTS 6,089,091 A * 7/2000 Nozoe et al. ............. 73/504.16
6,386,034 B1 * 5/2002 Nozoe ...................... 73/504.12
2006/0032311 A1 * 2/2006 Nozoe et al. .................. 73/527

FOREIGN PATENT DOCUMENTS

JP 62-52410 3/1987
JP 11-51655 2/1999

* cited by examiner

*Primary Examiner*—Hezron Williams
*Assistant Examiner*—Tamiko D Bellamy
(74) *Attorney, Agent, or Firm*—Posz Law Group, PLC

(57) ABSTRACT

A sensing circuit for a vibration type of angular rate sensor comprises a vibrator, driving unit, follow-up signal forming unit, normal voltage-range setting unit, and determining unit. The driving unit drives the vibrator to vibrate at a predetermined amplitude by using, as a feedback signal, an error voltage signal in which an amplitude of vibration of the vibrator is reflected. The follow-up signal forming unit forms, by using the error voltage signal, a follow-up signal following up the error voltage signal at changes which are gentler than changes in the error signal. The normal voltage-range setting unit sets a range of a normal voltage for the error voltage signal by using the follow-up signal. The determining unit determines whether or not the sensor circuit is in a malfunctioning condition, by using an estimation as to whether or not the error voltage signal is within the range of the normal voltage.

12 Claims, 4 Drawing Sheets

SENSING CIRCUIT FOR VIBRATION TYPE OF ANGULAR RATE SENSOR

CROSS-REFERENCE TO RELATED APPLICATION

This application is based on and claims the benefit of priority from earlier Japanese Patent Application No. 2004-301351 filed on Oct. 15, 2004, the description of which is incorporated herein by reference.

BACKGROUND OF THE INVENTION

1. Field of the Invention

This invention relates to a sensing circuit for vibration type of angular rate sensor (i.e., angular velocity sensor) provided with a malfunction detector. In particular, the present invention relates to a sensing circuit provided with a malfunction detector for detecting, with high accuracy, variation of driving impedance caused such as by attachment of foreign matter to a vibrator, the sensing circuit being applied, for example, to a vibration type of angular rate sensor used such as for vehicle control.

2. Description of Related Art

As a system for performing vehicle control by means of an angular rate sensor, stable control systems for vehicle, for example, are known in which vehicle sideslip is detected to optimally control a brake and torque of a vehicle to thereby maintain the vehicle in a normal condition. As such a system, four-wheel rudder angle control systems, for example, are also known in which a rudder angle of rear wheels or front wheels of a vehicle is controlled.

These types of systems typically detect malfunction conditions of a vehicle, such as sideslip, with a yaw rate signal, i.e. by means of an angular rate sensor. Malfunction of a yaw rate signal means a possible unstableness of the traveling characteristics of a vehicle, which may cause unexpected behavior of the vehicle.

One example of a technique for resolving the problem described above is disclosed in Published Japanese Unexamined Patent Application No. H11-051655. This technique includes a device for examining whether or not an angular rate sensor is in a normal operation. The device is so arranged to detect that a drive voltage corresponding to a driving force for a vibrator, has gone off a specified voltage, by means of a constant voltage circuit and a comparator, and to output self-diagnosis as a diagnostic detection signal.

Japanese Patent No. 2084567 discloses a technique in which the amplitude of a vibrator in a driving direction is detected, and amplitude control and 90-degree phase shift are effected in order to stabilize zero point/sensitivity of an angular rate signal, so that feedback control is effected as a drive signal.

A malfunction detection circuit, which is the combination of the techniques disclosed in the above publications, has been provided to a sensing circuit in an angular rate sensor. Specifically, a sensing circuit provided with a malfunction detection circuit, as shown in FIG. 4, has generally been employed.

As shown in FIG. 4, a sensing circuit in an angular rate sensor is so configured that it comprises a vibrator 30, an amplitude control circuit 40, and a malfunction detection circuit 50.

The vibrator 30 is provided with a driving sensor element and a pair of sensor elements for detecting yaw (not shown), and is so configured that, if yaw occurs when the driving sensor element is effecting driving vibration, the pair of detection sensor elements are vibrated by the Coriolis force. Since the vibrator 30 generates outputs corresponding to the respective vibrations of the pair of detection sensor elements, yaw can be detected based on the outputs. The vibrator 30 is so configured that it also generates an output corresponding to the driving vibration in order to detect that the driving sensor element is adequately effecting driving vibration.

The output from the vibrator 30 corresponding to the driving vibration, i.e. a vibration amplitude in a driving direction, is converted to a voltage in an i/v converter circuit (or C-V converter circuit) 41 and then passed to a rectification circuit 42 in order to obtain a DC voltage, which is equivalent to the vibration amplitude. Then, in a differential amplifier 44, an error voltage with reference to Vref1, which is generated by a first reference-voltage generation circuit 43, is detected as an error signal S61.

On the other hand, in order to permit the vibrator 30 to vibrate at a frequency of normal mode of vibration (resonance frequency) of the vibrator 30, a signal corresponding to the vibration amplitude, i.e. the output, of the i/v converter circuit 41 is passed to a 90-degree phase-shift circuit 46. The signal is then multiplied with the error signal S61, which is an output from the differential amplifier 44, in a multiplier 45 in an amplitude control circuit 40, for feeding back to the vibrator 30 as a driving voltage. As a result, the vibrator 30 can effect vibration at the resonance frequency, so that the amplitude is kept at a constant level.

If malfunction occurs, such as an attachment of foreign matter to the vibrator 30, to increase driving impedance, the driving amplitude of the vibrator 30 is decreased, which in turn decreases the output of the rectification circuit 42, making larger the difference between the rectifier output and the Vref1 generated by the first reference-voltage generation circuit 43. As a result, the error signal S61, which is an output of the differential amplifier 44, is magnified, and thus the driving voltage, which is an output of the multiplier 45, is increased. In this way, the driving amplitude is controlled so as to keep the driving amplitude of the vibrator 30 at a constant level.

In the vibrator 30 and the driving circuit 40 configured as described above, in order to detect malfunction of the vibrator 30 caused such as by the attachment of foreign matter, all that is required is to detect whether or not the error signal S61, which is an output of the differential amplifier 44 and is equivalent to the driving impedance, is within a specified range.

Thus, as shown in FIG. 4, an arrangement is made such that the error signal S61 is inputted to a window comparator 53 in a malfunction detection circuit 50, and that the error signal S61 is detected as to whether or not the voltage thereof is within a voltage ranging from Vref2 generated by a second reference-voltage generation circuit 51 to −Vref2 formed by an inverting circuit 52. If the voltage of the error signal S61 does not fall in this voltage range, a diagnostic detection signal S62 is adapted to be outputted.

The driving impedance of the vibrator 30, however, is unavoidably varied depending such as on the dimensional accuracy of the vibrator 30 and due to temperature variation and aging variation. Accordingly, circumstances have been such that, as a criterion for detecting malfunction of the vibrator 30 for the error signal which corresponds to the driving impedance of the vibrator 30, such values as described above in consideration of errors had to be set. Because of this, setting of values which are essentially required for malfunction detection have not been enabled, and thus no high-accuracy malfunction detection has been enabled.

Moreover, with the recent trend of downsizing of vibrators, vibrators are being replaced by those of semiconductor type which carry out detection in terms of capacitance. This, in turn, has come to give impact on zero point and sensitivity of an angular rate sensor with even the attachment of very small foreign matter which conventionally caused no problem. Thus, there is an increasing need for a malfunction detector having high accuracy and high reliability.

SUMMARY OF THE INVENTION

The present invention has been made in light of the points described above, and has as its object to provide a sensing circuit for vibration type of angular rate sensor provided with a malfunction detector for detecting variation of driving impedance caused such as by the attachment of foreign matter to a vibrator, enabling absorption of vibrator variation, temperature variation and aging variation, and/or enabling high-accuracy detection.

In order to achieve the above object, as one aspect, the present invention provides a sensing circuit for a vibration type of angular rate sensor, comprising: a vibrator; a driving unit driving the vibrator to vibrate at a predetermined amplitude by using, as a feedback signal, an error voltage signal in which an amplitude of vibration of the vibrator is reflected; a follow-up signal forming unit forming, by using the error voltage signal, a follow-up signal following up the error voltage signal at changes which are gentler than changes in the error signal; a normal voltage-range setting unit setting a range of a normal voltage for the error voltage signal by using the follow-up signal; and a determining unit determining whether or not the sensor circuit is in a malfunctioning condition, on the basis of an estimation as to whether or not the error voltage signal is within the range of the normal voltage.

Preferably, the normal voltage-range setting unit is formed, by using the follow-up signal, to set both of an upper reference voltage and a lower reference voltage which define the normal voltage range.

Still preferably, the determining unit includes a comparing member comparing the error voltage signal with the range of the normal voltage and outputting a diagnostic detection signal indicting whether or not an malfunction occurs in the error voltage signal, wherein the diagnostic detection signal indicates that the error voltage signal is free from the malfunction when the comparison shows that the error voltage signal is within the range of the normal voltage and the diagnostic detection signal indicates that the malfunction has occurred in the error voltage signal when the comparison shows that the error voltage signal is outside the range of the normal voltage.

It is preferred that the follow-up signal forming unit is a low-pass filter applying low-pass filtering to the error voltage signal so as to output a low-pass filtered signal serving as the follow-up signal.

It is also preferred that the determining unit further includes an estimating member estimating whether or not the sensor circuit is either in a normal condition or in the malfunctioning condition, on the basis of the diagnostic detection signal.

In this configuration, preferably, the estimating member comprises a trigger generating element generating a trigger in response to the diagnostic detection signal; a counting element counting a predetermined period of time responsively to the generation of the trigger; a determining element determining whether or not the sensor circuit is in the malfunctioning condition, on the basis of the trigger and the predetermined period of time.

In this configuration, by way of example, the trigger generating element and the counting element are composed of a timer and the determining element is composed of a latch circuit, wherein the timer is configured to (i) generate a latch signal serving as the trigger when the diagnostic detection signal given to the timer changes from a first state where the error voltage signal is free from the malfunction to a second state where the malfunction has occurred in the error voltage, (ii) count the predetermined period of time when the latch signal is generated, and (iii) reset the counting when the diagnostic detection signal given to the timer returns from the second state to the first state before the predetermined period of time is counted, and wherein the latch circuit is configured to latch the diagnostic detection signal unless the predetermined period of time is counted without receiving the diagnostic detection signal returns from the second state to the first state and to output a signal showing that the sensor circuit is in the malfunctioning condition.

DETAILED DESCRIPTION OF PREFERRED EMBODIMENTS

Hereinafter, embodiments of the present invention will be described with reference to the accompanying drawings.

Figure 1:
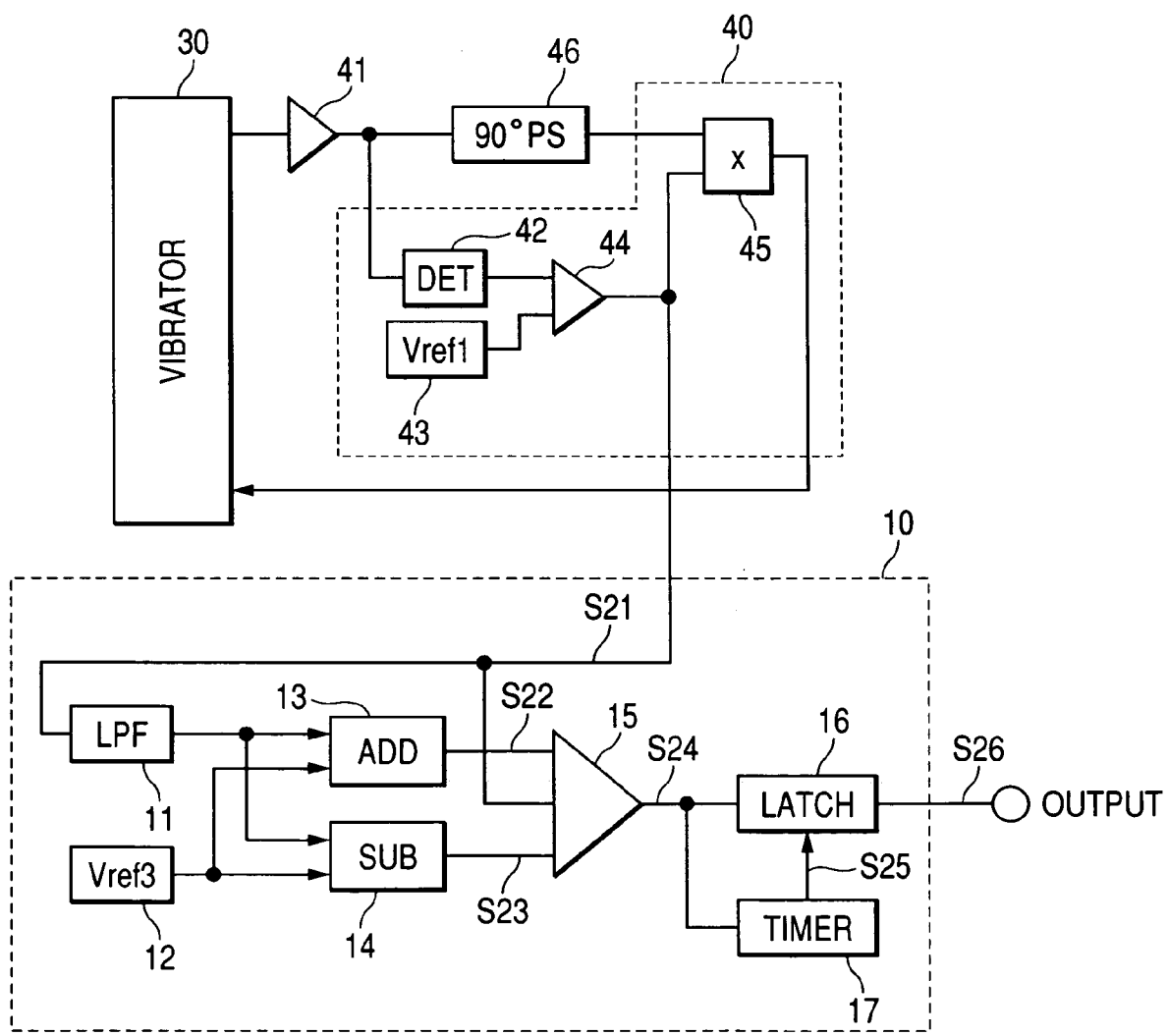
FIG. 1 is a diagram illustrating a block configuration of a sensing circuit for a vibration type of angular rate sensor according to a first embodiment of the present invention.
Figure 4:
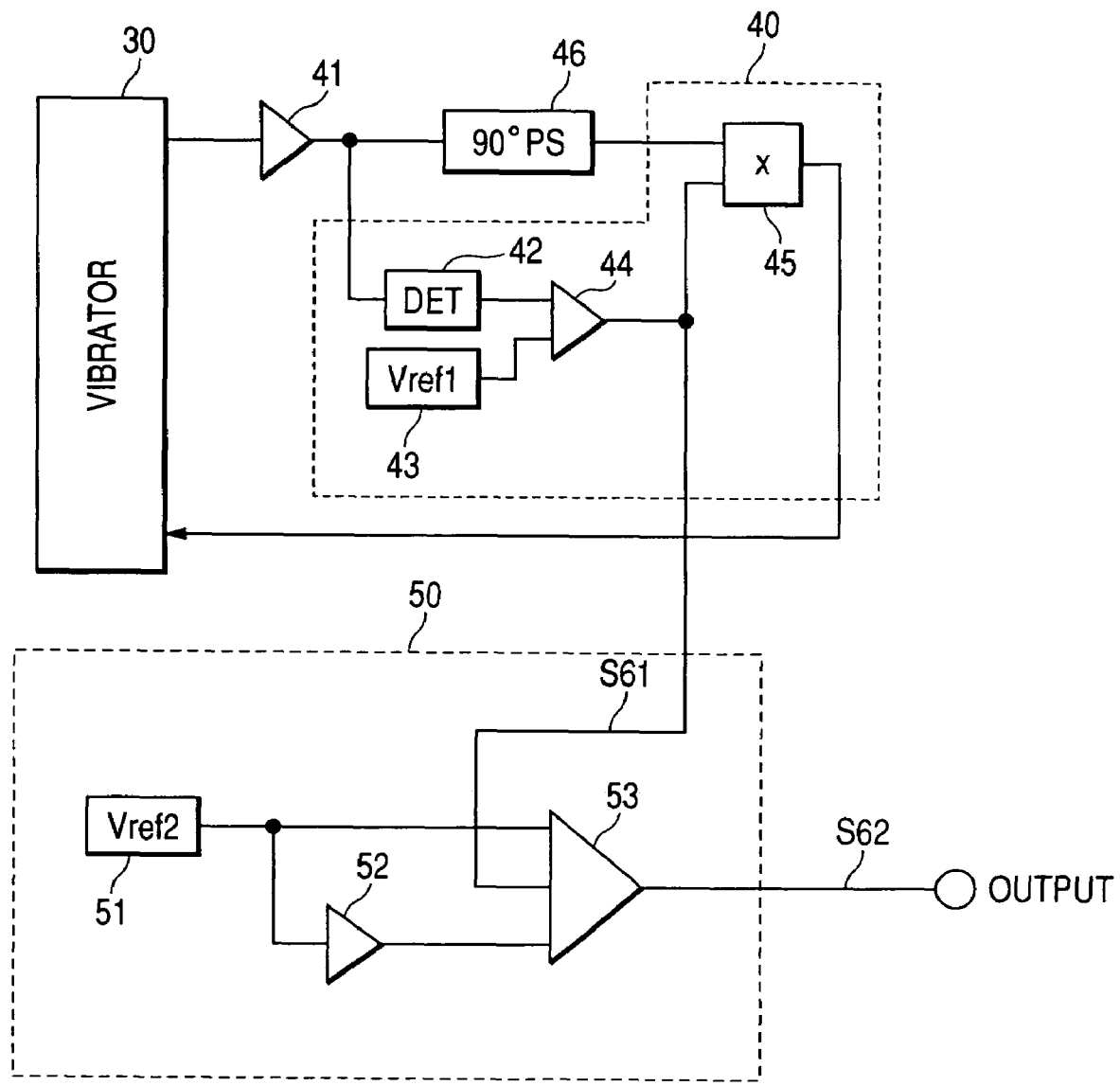
FIG. 4 is a diagram illustrating a block configuration of a sensing circuit of conventional vibration type of rate sensor.

FIG. 1 shows a sensing circuit for a vibration type of angular rate sensor (i.e., angular velocity sensor) applied to an embodiment of the present invention. The configuration of the sensing circuit of the present embodiment is described hereunder referring to FIG. 1. Details and operations related, for example, to a driving circuit 40 including a vibrator 30, i.e. related to similar parts in the configuration shown in FIG. 4, are as described above. Accordingly, only a malfunction detection circuit 10 provided to the sensing circuit is described hereunder.

The malfunction detection circuit 10 is arranged such that an error signal (voltage signal) S21 outputted from a differential amplifier 44 is inputted thereinto. The error signal S21 corresponds to a driving impedance involving vibrator variation, temperature variation and aging variation. Malfunction detection of high accuracy and high reliability is carried out based on the error signal S21.

As shown in FIG. 1, the malfunction detection circuit 10 comprises a low-pass filter (LPF) 11, third reference voltage generator 12, adder (ADD) 13, subtracter (SUB) 14, and window comparator 15.

The LPF 11 has a large time constant, receives the error signal S21, and generates an output signal moderately following up the error signal S21. In particular, the LPF 11 is arranged such that it basically generates an output having a voltage equivalent to the error signal S21, however, if the error signal S21 drastically changes, generates an output not with a follow-up completely matching the variation, but with a little delayed follow-up. Specifically, as the LPF 11, one having a cut-off frequency at a level of 0.1 Hz or 0.01 Hz is adapted to absorb the temperature variation and aging variation. The output of the LPF 11 is adapted to be inputted to the ADD 13 and the SUB 14.

The reference-voltage generation circuit 12 generates a reference voltage (a third reference voltage) Vref3. This reference voltage Vref3 is for determining a range of a determination threshold in the window comparator 15. The reference voltage Vref3 is also inputted to the ADD 13 and the SUB 14.

The ADD 13 and the SUB 14 correspond to normal voltage range forming means.

The ADD 13 outputs a voltage S22 which is derived by adding the reference voltage Vref3 to the output of the LPF 11. The voltage S22 outputted from the ADD 13 is adapted to be inputted to the window comparator 15 and to be set as an uppermost reference voltage. The voltage S22 outputted from the ADD 13 is referred, hereinafter, to the uppermost reference voltage.

The SUB 14 outputs a voltage S23 which is derived by subtracting the reference voltage Vref3 from the output of the LPF 11. The voltage S23 outputted from the SUB 14 is adapted to be inputted to the window comparator 15 and to be set as a lowermost reference voltage in the window comparator 15. The voltage S23 outputted from the SUB 14 is referred, hereinafter, to the lowermost reference voltage.

The window comparator 15 determines whether or not the voltage of the error signal S21 falls within a normal voltage range defined by the uppermost reference voltage S22 outputted from the ADD 13 and the lowermost reference voltage S23 outputted from the SUB 14. The window comparator 15 is so arranged as to generate a diagnostic detection signal S24 depending on whether or not the voltage of the error signal S21 falls in the normal voltage range. If, for example, the voltage is in the normal voltage range, the diagnostic detection signal S24 becomes high level which is indicative of normal function, and if the voltage is out of the normal voltage range, the diagnostic detection signal S24 becomes low level which is indicative of malfunction.

In the malfunction detection circuit 10 of the present embodiment, a latch circuit 16 and a timer circuit 17 are provided.

The latch circuit 16 latches the diagnostic detection signal S24 of the window comparator 15. Specifically, the latch circuit 16 is so arranged as to latch the diagnostic detection signal S24 based on a latch signal S25 from the timer circuit 17, which will be described later. More specifically, the latch circuit 16 is so arranged as to generate a voltage as an output signal S26 that matches the diagnostic detection signal S24 of the window comparator 15 until the latch signal S25 is inputted from the timer circuit 17, and, upon input of the latch signal S25, to latch the diagnostic detection signal S24 of the window comparator 15 at the time of the input of the latch signal S25, for generation as the output signal S26.

The timer circuit 17 is adapted to start up, as a trigger, the rise and fall of the diagnostic detection signal S24 of the window comparator 15. Specifically, the timer circuit 17 is so arranged as to switch on a timer when the fall of the diagnostic detection signal S24 is detected, to stop and reset the timer when the rise of the diagnostic detection signal S24 is detected before a specified time interval Tset (e.g., 1 second or thereabouts is preferable) has elapsed in the timer, and to output the latch signal S25 when the specified time interval Tset has elapsed in the timer.

The sensing circuit of the present embodiment is configured as described above. Subsequently, an operation of the malfunction detection circuit in the thus configured sensing circuit is described hereunder.

Upon input of the error signal S21 into the malfunction detection circuit 10, an output following up the error signal S21 is generated from the LPF 11. Then, the uppermost reference voltage S22 and the lowermost reference voltage S23 are formed, respectively, in the ADD 13 and the SUB 14 based on the output of the LPF 11 and the reference voltage Vref3 generated by the third reference voltage generator 12, and are inputted to the window comparator 15. Thus, a range of ±Vref3 centering on the output of the LPF 11 is defined as a normal voltage range.

Thus, in the window comparator 15, the voltage of the error signal S21 is determined as to whether or not it falls between the uppermost reference voltage S22 and the lowermost reference voltage S23, i.e. within the normal voltage range. If the voltage of the error signal S21 is within the normal voltage range, the diagnostic detection signal S24 from the window comparator 15 presents a voltage indicative of normal function. Contrarily, if not within the normal voltage range, the diagnostic detection signal S24 from the window comparator 15 presents a voltage indicative of malfunction.

If the diagnostic detection signal S24 is kept at a high level condition, the output voltage 826 from the latch circuit 16 also remains at a level indicative of the normal function. However, if the voltage of the diagnostic detection signal (detection signal) S24 changes only momentarily from the one indicative of normal function to the one indicative of malfunction, a voltage indicative of malfunction is outputted as the output signal S26 from the latch circuit 16.

Thus, when the voltage of the diagnostic detection signal S24 from the window comparator 15 changes, if only for a moment, to the one indicative of malfunction, such a voltage is externally outputted, so that the occurrence of malfunction in the sensing circuit can be detected.

Then, when the voltage of the diagnostic detection signal S24 changes from the one indicative of normal function to the one indicative of malfunction, such a change serves as a trigger for starting the timer of the timer circuit 17.

In this connection, if the voltage of the diagnostic detection signal S24 changes from the one indicative of malfunction to the one indicative of normal function before a specified time interval Tset has elapsed in the timer, the timer is stopped and reset. Therefore, no latch signal S25 is outputted from the timer circuit 17, and no voltage indicative of malfunction is latched in the latch circuit 16. Thus, the output signal 826 of the latch circuit 17 reverts to a voltage indicative of normal function. Accordingly, in this case, the malfunction that has occurred in the sensing circuit has been detected as a momentary one.

Contrarily, if the voltage of the diagnostic detection signal S24 remains as the one indicative of malfunction until the specified time interval Tset has elapsed in the timer, the latch signal S25 is outputted from the timer circuit 17, and a voltage indicative of malfunction is latched in the latch circuit 16. Thus, the output signal S26 of the latch circuit 17 remains as a voltage indicative of malfunction. Accordingly, in this case, the malfunction that has occurred in the sensing circuit has been detected as a long-lasting one.

A malfunction detection circuit operates as described above. Timing diagrams of such an operation are shown in FIGS. 2 and 3.

Figure 2:
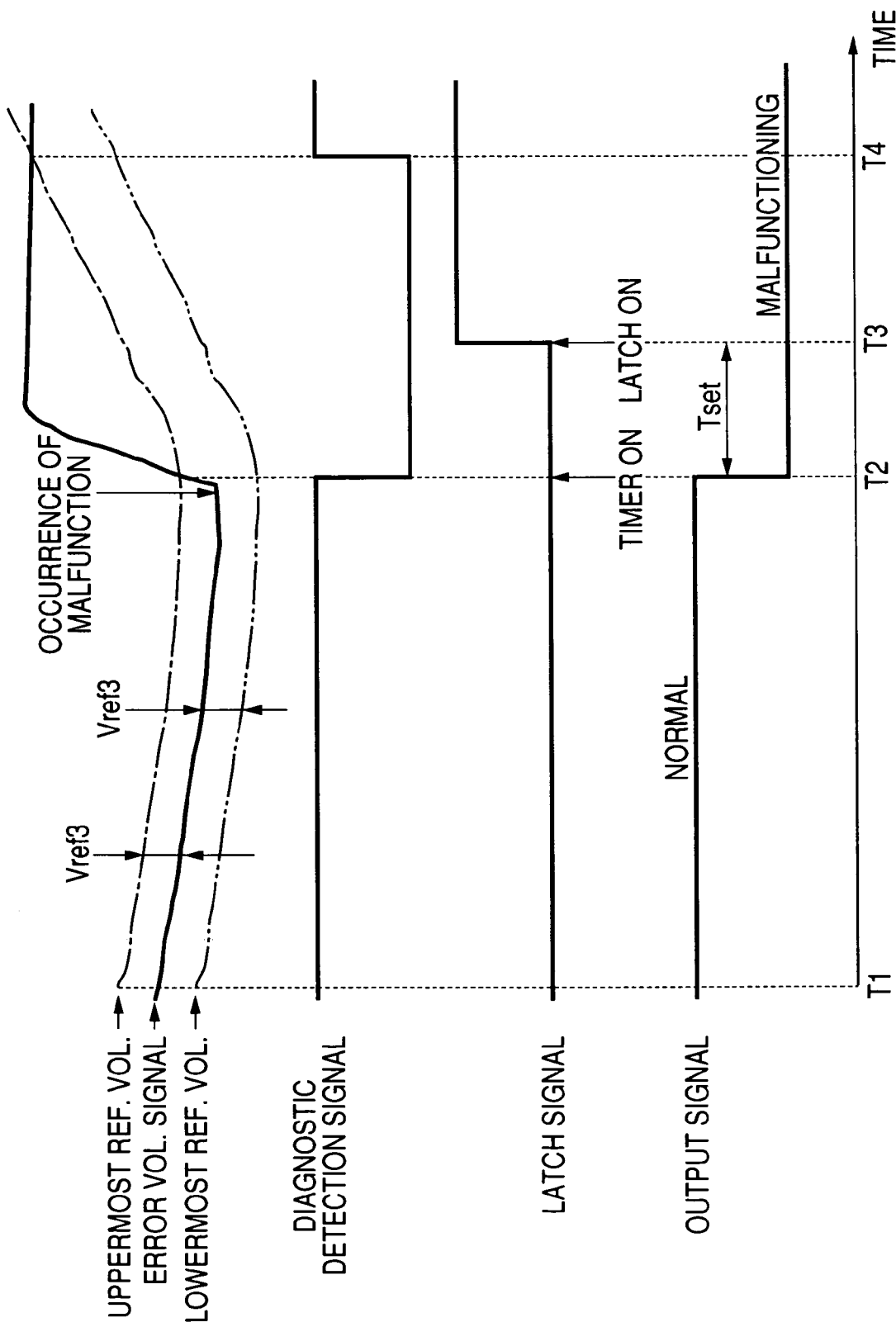
FIG. 2 is a timing diagram in case long-last malfunction has occurred in the angular rate sensor.
Figure 3:
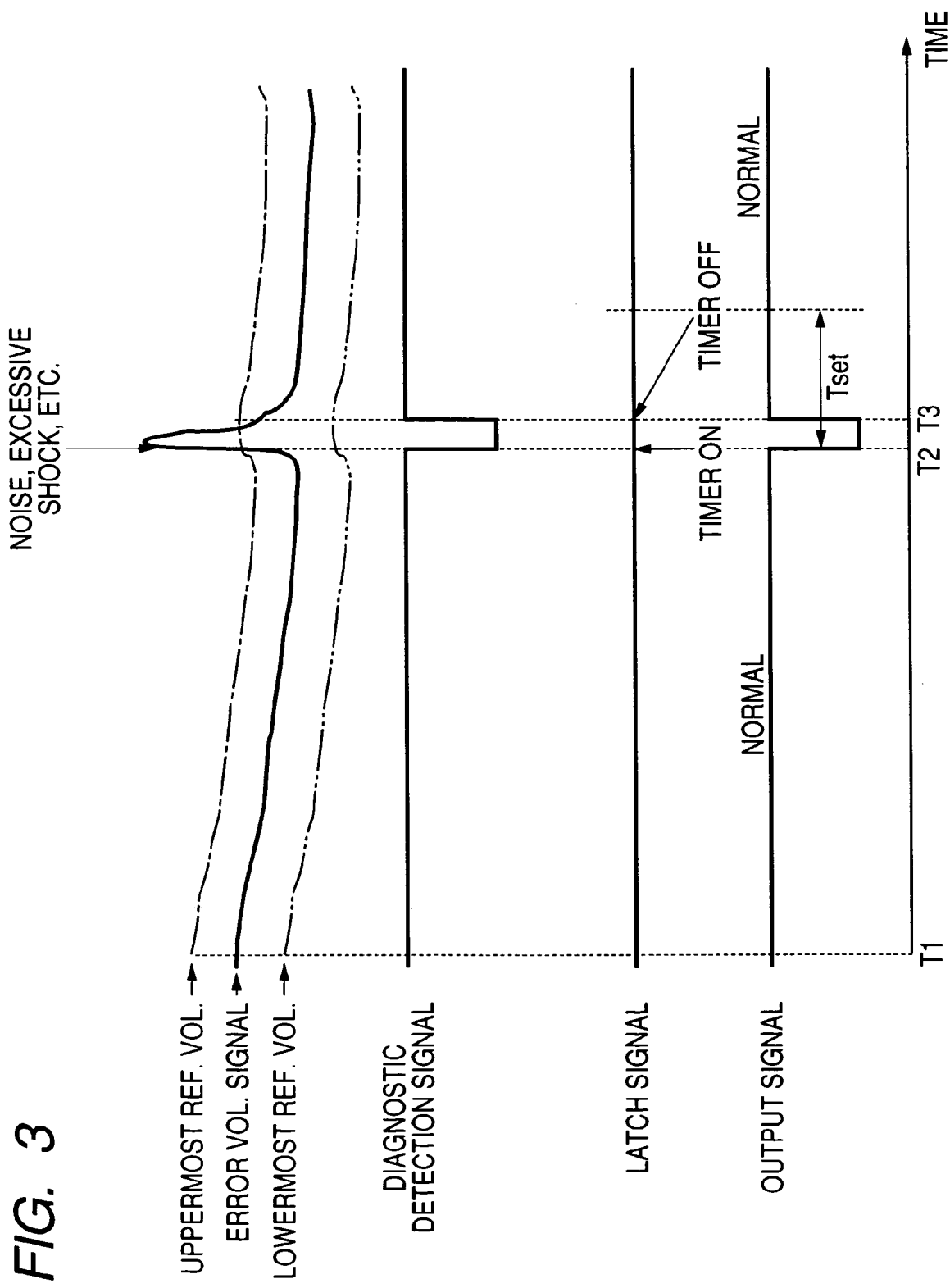
FIG. 3 is a timing diagram in case momentary malfunction has occurred in the angular rate sensor.

FIG. 2 shows a timing diagram in case a long-lasting malfunction has occurred in an angular rate sensor. FIG. 3 shows a timing diagram in case the error signal S21 has temporarily become abnormal caused such as by noise and impression of an over impact. FIGS. 2 and 3 also show the operation of the uppermost reference voltage S22 and the lowermost reference voltage S23 in case the error signal S21 has moderately varied being influenced by temperature variation and aging variation.

For the period between time T1 and time T2 in FIG. 2, the uppermost reference voltage S22 and the lowermost reference voltage S23 are formed basically centering on the error signal S21. During this period the diagnostic detection signal S24 of the window comparator 15 is at a high level indicative of normal function, and the latch signal 825 of the timer circuit 17 is at a low level. Accordingly, the output signal S26 of the latch circuit 16 remains at a high level which is also indicative of normal function.

When a long-lasting malfunction occurs in the sensing circuit at the time T2, the error signal S21 drastically changes at the very moment the malfunction has occurred, however, both of the uppermost reference voltage S22 and the lowermost reference voltage S23 cannot follow up the change. Thus, the error signal S21 runs out of the normal voltage range defined by both of the uppermost reference voltage S22 and the lowermost reference voltage S23.

Thus, the diagnostic detection signal S24 of the window comparator 15 goes down to a low level indicative of malfunction, and the output signal S26 of the latch circuit 16 also goes down to a low level indicative of malfunction. At this time, the latch signal S25 of the timer circuit 17 remains at a low level, while the timer of the timer circuit 17 is started.

If the diagnostic detection signal S24 remains in the state of low level indicative of malfunction until time T3, the latch signal S25 of the timer circuit 17 then goes up to a high level to latch the diagnostic detection signal S24 in the latch circuit 16. Accordingly, the output signal S26 of the latch circuit 16 remains at a low level indicative of malfunction. Thus, even when the follow-up to the uppermost reference voltage S22 and the lowermost reference voltage S23 is completed at time T4 to have the error signal S21 fallen within the range between the uppermost reference voltage S22 and the lowermost reference voltage S23 and to have the diagnostic detection signal S24 reverted to a high level, the output signal S26 of the latch circuit 16 still remains at a low level indicative of malfunction.

In FIG. 3, for the period between time T1 and time T2, the uppermost reference voltage S22 and the lowermost reference voltage S23 are formed following up the error signal S21 just as the period between the time T1 and the time T2 in FIG. 2.

When momentary malfunction occurs in the sensing circuit at the time T2, the error signal S21 again drastically changes just as at T2 in FIG. 2, however, the uppermost reference voltage S22 and the lowermost reference voltage again cannot follow up the change. Thus, the error signal S21 runs out of the normal voltage range defied by the uppermost reference voltage S22 and the lowermost reference voltage S23.

Therefore, as in the case shown in FIG. 2, the output signal S26 of the latch circuit 16 goes down to a low level indicative of malfunction, while the timer of the timer circuit 17 is started. However, since the error signal S21 reverts to a voltage of normal function at time T3, the output signal S26 of the latch circuit 16 also immediately reverts to a high level indicative of normal function to stop and reset the timer of the timer circuit 17.

In such a case, therefore, although a low-level signal indicative of malfunction is momentarily outputted from the latch circuit 16, a high-level signal indicative of normal function is soon outputted thereafter.

As described above, in the present embodiment, the uppermost reference voltage S22 and the lowermost reference voltage S23 are formed with reference to the error signal $21. For this reason, even when the error signal S21 is varied by the variation of the vibrator 30, temperature variation and aging variation, the uppermost reference voltage S22 and the lowermost reference voltage S23 can be formed with reference to the error signal S21. Accordingly, the uppermost reference voltage S22 and the lowermost reference voltage S23 can be the ones that have absorbed the variation of the vibrator 30, temperature variation and aging variation.

In the present embodiment, the arrangement is made such that the uppermost reference voltage S22 and the lowermost reference voltage S23 moderately follow up the error signal S21. Thus, when the error signal S21 is varied induced by abnormalities other than the variation of the vibrator 30, temperature variation and aging variation, detection of such abnormalities is enabled. Accordingly, the malfunction detection circuit 10 is enabled to absorb the variation of the vibrator 30, temperature variation and aging variation, and to accurately carry out detection.

Further, in the present embodiment, the latch circuit 16 and the timer circuit 17 are adapted to be used. It is possible, therefore, to make a distinction between the occurrence of a momentary malfunction and the occurrence of a long-lasting malfunction.

OTHER EMBODIMENTS

In the embodiment described above, it is so arranged that the uppermost reference voltage S22 and the lowermost reference voltage S23 moderately follow up the error signal S21 by means of the LPF 11. This, however, is only an example, and the LPF 11 does not necessarily have to be used. For example, although the LPF 11 is comprised of an integration circuit, a differentiation circuit may be generally applied to detect variation. However, in case a vibration type of angular rate sensor is used in a high-noise environment, as in the case of a gyro sensor for use in a vehicle, an integration circuit may preferably be used to sensitively detect the noise.

The uppermost reference voltage S22 and the lowermost reference voltage S23 may also be constituted with reference, for example, to an average of the error signal S21 in a predetermined period of time. In this case, a normal voltage range may be specified within ±Vref3 from the average of the error signal S21 in the predetermined period of time.

The present invention may be embodied in other specific forms without departing from the spirit or essential characteristics thereof. The foregoing embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein,

What is claimed is:

1. A sensing circuit for a vibration type of angular rate sensor, comprising:
   a vibrator;
   a driving unit that drives the vibrator to vibrate at a predetermined amplitude by using, as a feedback signal, an error voltage signal in which an amplitude of vibration of the vibrator is reflected;
   a follow-up signal forming unit that forms, by using the error voltage signal, a follow-up signal following up the error voltage signal at changes which are gentler than changes in the error signal;
   a normal voltage-range setting unit that sets a range of a normal voltage for the error voltage signal by using the follow-up signal; and a determining unit that determines whether or not the sensor circuit is in a malfunctioning condition, on the basis of an estimation as to whether or not the error voltage signal is within the range of the normal voltage.

2. The sensing circuit according to claim 1, wherein the normal voltage-range setting unit is formed, by using the follow-up signal, to set both of an upper reference voltage and a lower reference voltage which define the normal voltage range.

3. The sensing circuit according to claim 2, wherein the determining unit includes a comparing member comparing the error voltage signal with the range of the normal voltage and outputting a diagnostic detection signal indicting whether or not an malfunction occurs in the error voltage signal,
wherein the diagnostic detection signal indicates that the error voltage signal is free from the malfunction when the comparison shows that the error voltage signal is within the range of the normal voltage and the diagnostic detection signal indicates that the malfunction has occurred in the error voltage signal when the comparison shows that the error voltage signal is outside the range of the normal voltage.

4. The sensing circuit according to claim 1, wherein the follow-up signal forming unit is a low-pass filter applying low-pass filtering to the error voltage signal so as to output a low-pass filtered signal serving as the follow-up signal.

5. The sensing circuit according to claim 3, wherein the determining unit further includes an estimating member estimating whether or not the sensor circuit is either in a normal condition or in the malfunctioning condition, on the basis of the diagnostic detection signal.

6. The sensing circuit according to claim 5, wherein the estimating member comprises
a trigger generating element generating a trigger in response to the diagnostic detection signal;
a counting element counting a predetermined period of time responsively to the generation of the trigger;
a determining element determining whether or not the sensor circuit is in the malfunctioning condition, on the basis of the trigger and the predetermined period of time.

7. The sensing circuit according to claim 6, wherein the trigger generating element and the counting element are composed of a timer and the determining element is composed of a latch circuit,
wherein the timer is configured to (i) generate a latch signal serving as the trigger when the diagnostic detection signal given to the timer changes from a first state where the error voltage signal is free from the malfunction to a second state where the malfunction has occurred in the error voltage, (ii) count the predetermined period of time when the latch signal is generated, and (iii) reset the counting when the diagnostic detection signal given to the timer returns from the second state to the first state before the predetermined period of time is counted, and
wherein the latch circuit is configured to latch the diagnostic detection signal unless the predetermined period of time is counted without receiving the diagnostic detection signal returns from the second state to the first state and to output a signal showing that the sensor circuit is in the malfunctioning condition.

8. The sensing circuit according to claim 2, wherein the follow-up signal forming unit is a low-pass filter applying low-pass filtering to the error voltage signal so as to output a low-pass filtered signal serving as the follow-up signal.

9. The sensing circuit according to claim 8, wherein the normal voltage-range setting unit includes an adder adding a predetermined reference voltage signal to the low-pass filtered signal so as to form the upper reference voltage and a subtracter subtracting the predetermined reference voltage signal from the low-pass filtered signal so as to form the lower reference voltage.

10. The sensing circuit according to claim 1, wherein the driving unit is configured to apply a drive voltage to the vibrator and to feed back the error voltage signal to the vibrator so as to cause the vibrator to vibrate at a predetermined amplitude, the error voltage signal showing a difference between the voltage corresponding to an amplitude of vibration of the vibrator and a further predetermined reference voltage.

11. A sensing circuit for a vibration type of angular rate sensor, comprising:
a vibrator;
driving means for driving the vibrator to vibrate at a predetermined amplitude by using, as a feedback signal, an error voltage signal in which an amplitude of vibration of the vibrator is reflected;
follow-up signal forming means for forming, by using the error voltage signal, a follow-up signal following up the error voltage signal at changes which are gentler than changes in the error signal;
normal voltage-range setting means for setting a range of a normal voltage for the error voltage signal by using the follow-up signal; and
determining means for determining whether or not the sensor circuit is in a malfunctioning condition, on the basis of an estimation as to whether or not the error voltage signal is within the range of the normal voltage.

12. A sensing circuit for a vibration type of angular rate sensor, comprising:
a vibrator;
a driving unit that drives the vibrator to vibrate at a predetermined amplitude by using, as a feedback signal, an error voltage signal in which an amplitude of vibration of the vibrator is reflected;
a follow up signal forming unit that forms, by using the error voltage signal, a follow-up signal following up the error voltage signal at changes which are gentler than changes in the error signal;
a normal voltage-range setting unit that sets a range of a normal voltage for the error voltage signal by using the follow-up signal; and
an estimating unit that estimates whether or not the error voltage signal is within the range of the normal voltage, whereby the error voltage signal is estimated as being normal when the error signal is within the range of the normal voltage and as being malfunctioning when the error signal is outside the range of the normal voltage.

* * * * *